United States Patent [19]

Johnson et al.

[11] 3,796,380
[45] Mar. 12, 1974

[54] MOLDED PLASTIC PLUMBING FIXTURE

[75] Inventors: Tom W. Johnson; Joe L. Johnson, both of Burton, Ohio

[73] Assignee: Sajar Plastics, Inc., Middlefield, Ohio

[22] Filed: Dec. 22, 1972

[21] Appl. No.: 317,807

[52] U.S. Cl. ................... 239/590.5, 4/195, D23/23, 137/801
[51] Int. Cl. ............................................ F16k 21/00
[58] Field of Search ............... 4/187, 191, 192, 195; 239/589, 590, 590.5; D23/23–26; 137/801

[56] References Cited
UNITED STATES PATENTS

| D44,107 | 5/1913 | Newton | D23/23 |
| D193,604 | 9/1962 | Zeigler | D23/23 |

Primary Examiner—Lloyd L. King
Assistant Examiner—Michael Y. Mar
Attorney, Agent, or Firm—Watts, Hoffmann, Fisher & Heinke Co.

[57] ABSTRACT

An injection molded plastic plumbing fixture comprised of a support body defining an inlet flow passage and a tubular spout molded to and projecting from the body. A discharge opening is defined at the projecting end of the spout and a flow passageway extends through the spout from the discharge opening to intersect the inlet flow passage. The flow passageway extends completely through the body thus reducing the mass of plastic material required to form the rear side of the body. A molded recess formed in the rear side of the body further reduces the amount of plastic required to form the body.

The flow passageway at the rear side of the support body is sealed by a closure which comprises a plug extending into the passageway and a seal between the plug and the passageway. The plug carries a flange or skirt which interfits with the body recess and is ultrasonically welded to the body so that the exterior of the rear side of the fixture is formed in part by the plug and skirt.

12 Claims, 12 Drawing Figures

PATENTED MAR 12 1974   3,796,380

MOLDED PLASTIC PLUMBING FIXTURE

CROSS REFERENCED APPLICATION

U. S. Pat. Application Ser. No. 234,073 entitled MIXING VALVE ASSEMBLY by Johnson et al., filed Mar. 13, 1972.

BACKGROUND OF THE INVENTION

1. Field of the Invention

The present invention relates to plumbing fixtures and more particularly relates to plastic injection molded plumbing fixtures such as faucets or spouts.

2. The Prior Art

There have been a number of past proposals for constructing plumbing fixtures from injection molded plastic materials. Such fixtures were relatively inexpensive, light, corrosion resistant and could be provided with metallized finishes which simulated the finishes of metal fixtures.

Production of plastic fixtures by injection molding has had the advantage of providing fixtures, such as spouts and faucets, which had complex shapes yet were composed of a relatively few parts which were assembled to complete the fixture. Thus, for example, the prior art has proposed the construction of spouts and faucets in which a support body and spout member were partly formed by one injection molded body and one or more additional molded parts were then fixed to the body and/or spout to complete the assembly. Assembly of the injection molded parts involved accurately registering the parts with each other, maintaining the parts in registry while connecting them together, and connecting the parts together in such a way that leakage of water from the fixture would not occur. These assembly steps were critical and tedious and increased manufacturing costs considerably.

Spouts and faucets which are assembled to sinks or wash basins in homes, offices, etc., must be designed in such a way that their external shape is aesthetically pleasing. As a consequence such fixtures have often been formed with portions having relatively thick wall sections or at least having that appearance. When the required external shape and appearance of the fixture dictated heavy wall thicknesses, injection molding the parts was frequently unsuccessful because unequal cooling rates of the plastic material forming the thick wall sections caused unsightly depressions in exterior surfaces of the fixtures.

This problem can be particularly pronounced in and around a support body on the side opposite a projecting spout member and tends to restrict the external appearance of the fixtures to relatively functional lines or, alternatively, requires the use of relatively complex molds and fabrication and assembly of relatively numerous components to achieve a desired external appearance.

SUMMARY OF THE INVENTION

The present invention provides a new and improved injection molded plastic plumbing fixture such as a spout or faucet assembly, which is constructed and arranged so that the external configuration of the fixture may have a decorative nonfunctional appearance devoid of surface depressions caused by shrinkage of the plastic after molding and which is quickly and efficiently assembled.

According to one preferred construction of the invention a spout member is defined by a support body and a projecting tubular spout molded to the body. The body defines a fluid inlet passage while the spout defines a fluid discharge opening and a fluid passageway which intersects the inlet passage and extends to the discharge opening. The fluid passageway extends through the body and defines an end opening in the body remote from the discharge opening.

The passageway is formed by a mold core element and the extension of the passageway to the exterior of the body reduces the mass of material forming the body on its side opposite the spout.

The passageway end opening is blocked by a closure which comprises a molded plug element extending into the passageway, a fluid seal between the plug and the passageway, and a surface supported by the plug for engaging the body in such a way that the plug is prevented from being dislodged by differential pressure forces acting on the plug. The surface is preferably defined by a flange or skirt formed with the plug.

In one preferred embodiment the molded body defines a recess or cavity in its exterior surface which is formed at least partly by the passageway end opening. This recess further reduces the mass of plastic material required to form the body. The plug flange or skirt portion is shaped to interfit with the recess when the plug is positioned in the passageway. The external surfaces of the flange or skirt and the plug form an integral part of the exterior design configuration of the spout assembly and give the assembly a massive nonfunctional appearance.

In the illustrated construction the closure is snapped into place and bonded to the body by an ultrasonic weldment formed between the plug skirt and the body. Alternatively the plug skirt can be bonded to the body by an adhesive or can be simply snap-fitted in place in the recess and thus mechanically locked in place. This assembly is quickly and easily performed since the closure is self-aligning with the body recess and the welded or bonded connection need not be fluid tight.

A principal object of the present invention is the provision of a new and improved molded plastic plumbing fixture such as a faucet or a spout assembly which is quickly and easily assembled and comprises a molded support body and projecting tubular spout in which the mass of plastic material forming a support body is minimized to avoid the adverse effects of shrinkage of the plastic material after molding yet wherein the rearward side of the support body defines decorative nonfunctional lines.

Other objects and advantages of the invention will become apparent from the following detailed description made with reference to the accompanying drawings which form part of the specification.

DESCRIPTION OF A PREFERRED EMBODIMENT

Figure 1:
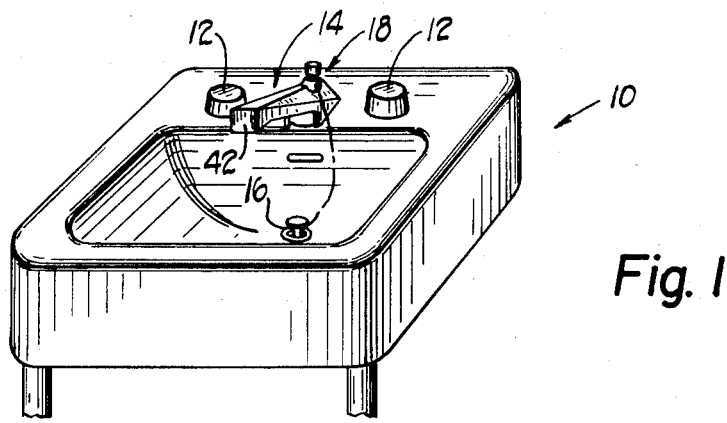
FIG. 1 is an isometric view of part of a wash basin employing a spout assembly constructed according to the present invention.

A wash basin 10 employing a fixture constructed according to the present invention is illustrated in FIG. 1. The wash basin 10 comprises valve operating handles 12 connected to a mixing valve assembly, which is not shown but can be of any suitable construction such as that disclosed in the above cross referenced application to Johnson et al.; a spout assembly 14 for directing water from the mixing valve into the wash basin; a drain assembly 16 located at the bottom of the wash basin; and a drain plug actuator 18 for opening and closing a drain.

Figure 2:
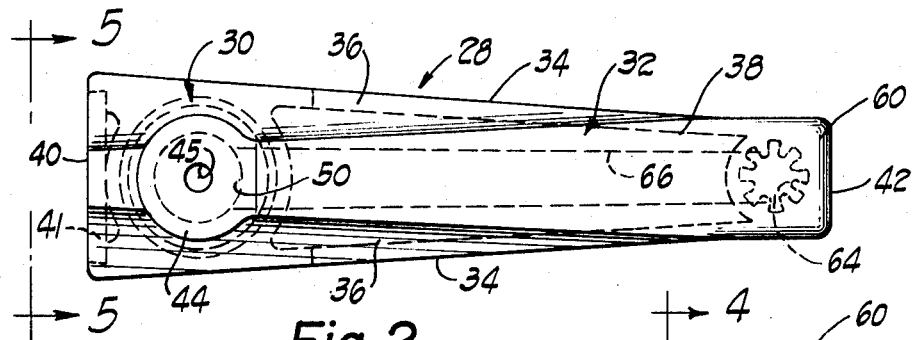
FIG. 2 is a top plan view of part of a spout assembly embodying the present invention.
Figure 3:
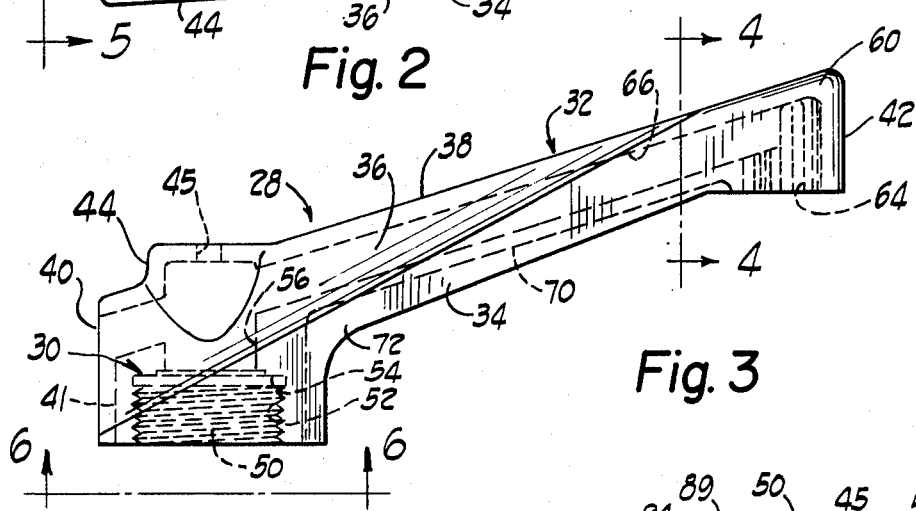
FIG. 3 is a side elevational view of the part shown in FIG. 2.

A molded spout member 28 of the spout assembly 14 is illustrated in FIGS. 2 and 3 and comprises a support body 30 and a projecting tubular spout 32 molded to the body portion 30. The spout member 28 is formed by a single piece of injection molded plastic having a nonfunctional external appearance except for its rearward side. As seen in FIGS. 2 and 3 the exterior of the spout member 28 is defined by planar rearwardly diverging side surfaces 34, triangular rearwardly diverging planar surfaces 36 which merge with the side surfaces 34, and a rearwardly tapering top surface 38. The triangular surfaces 36 merge with the top surface 38 along the top of the spout. The rearward end 40 of the spout member has its sides defined by the rearward ends of the surfaces 36, 38, has a generally triangular silhouette (see FIG. 5) and is formed in part by a molded-in recess or cavity 41 which is described in greater detail presently. The forward or projecting end of the spout defines a generally rectangular front face 42.

In the illustrated spout member a generally cylindrical projection 44 is molded vertically over the support body and merges smoothly in the top surface 38 and the triangular surfaces 36. A circular top opening 45 is defined in the projection 44.

Figure 6:
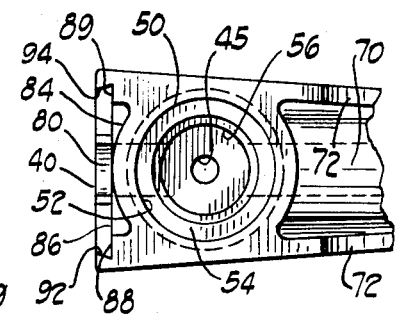
FIG. 6 is a bottom elevational view seen from the plane indicated by the line 6—6 of FIG. 3.
Figure 7:
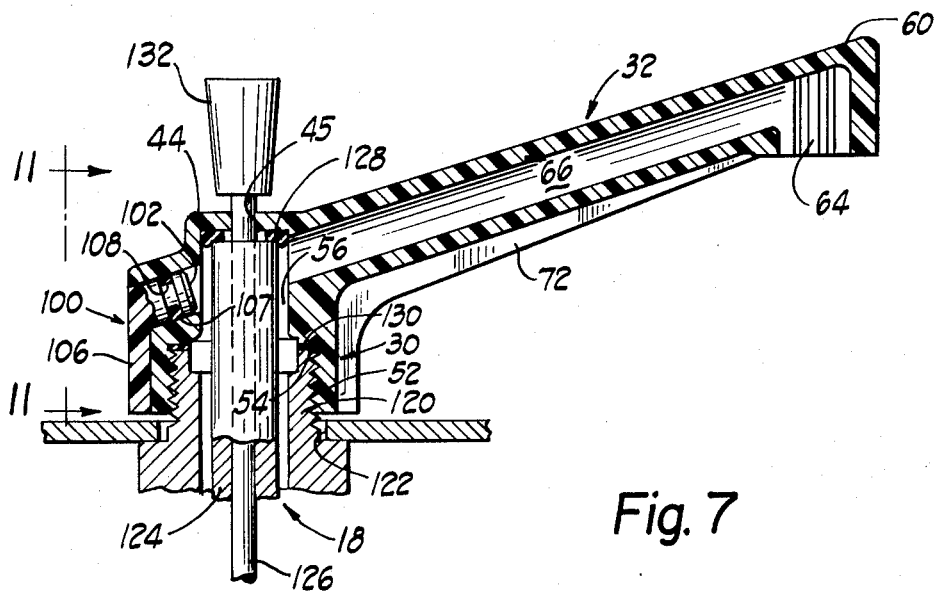
FIG. 7 is a fragmentary vertical cross sectional view of a spout assembly embodying the invention associated with a wash basin or the like only a part of which is illustrated.

The support body 30 defines a cylindrical shouldered opening 50 by which the spout assembly is supported on the mixing valve and through which water flows from the mixing valve into the spout. The opening 50 is illustrated in FIGS. 3, 6 and 7 and comprises an internally threaded connector portion 52 which terminates in a radially inwardly projecting shoulder 54. A cylindrical inlet passage portion 56 extends upwardly from the shoulder 54.

The spout 32 defines a projecting forward end 60 in which a discharge opening is formed by a short upwardly extending discharge passage 64. A flow passageway 66 extends within the spout 32 from the discharge passage 64 to the inlet passage 56 which is intersected by the passageway 66.

The discharge passage 64, in the preferred embodiment, is formed by a fluted or finned mold core and hence contains a plurality of radially inwardly projecting molded fins which serve to guide the water flowing from the discharge passage and smoothen the flow of a stream of water emerging from the spout.

Figure 4:
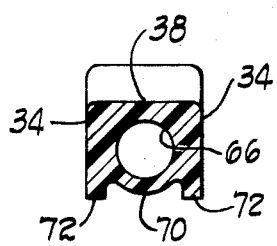
FIG. 4 is a view seen from the plane indicated in line 4—4 in FIG. 3.

The flow passageway 66 is preferably generally cylindrical and is formed by a mold core extending through the spout member mold cavity from the rearward end of the body to the discharge passage mold core. The passageway 66 is defined by a lower cylindrically curved wall section 70 (see FIG. 4) and the remaining walls of the passageway 66 extend to the surfaces 34, 36, 38. These surfaces are related to each other so that the cross sectional thickness of the spout walls are relatively thin progressing along the length of the spout 32.

The side surfaces 34 are formed in part by molded stiffening ribs 72 which extend downwardly along opposite sides of the spout 32 throughout its length. The ribs 72 lend a massive appearance to the spout 32 while reducing the volume of plastic required to form the spout. The ribs 72 are curved near the juncture of the spout and body and merge into the body to provide additional rigidity to the spout and to hide the cylindrical lower wall 70 of the spout from view.

Figure 5:
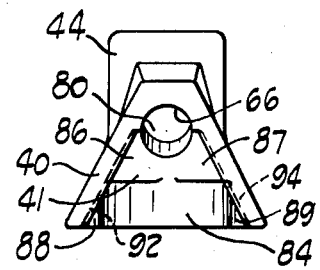
FIG. 5 is a rear elevational view seen from the plane indicated by the line 5—5 of FIG. 2.

The spout assembly 14 is constructed and arranged so that its rearward end 4 has a massive appearance yet is devoid of sections containing large masses of molded plastic which might otherwise shrink and create unsightly depressions. To this end the passageway 66 extends through the support body and defines an end opening 80 at the rearward end 40 of the support body (see FIG. 5). Referring to FIGS. 5 and 6, the recess 41 in the rearward end of the body 32 further reduces the mass of plastic material required for molding the body. As shown in FIG. 5, the recess 41 has a generally triangular shape. The base of the recess is defined by a semicylindrical surface 84 formed by the wall of the base opening 50 (see FIG. 6), generally planar lands 86–89 all of which preferably lie in a common plane tangent to the surface 84, and the end opening 80 of the passageway 66. As shown in FIG. 6, the sides of the recess are formed by a wall portion of the passageway 66 and undercut downwardly diverging side walls 92, 94. The recess is open along the bottom of the rearward side of the spout member.

Referring now to FIG. 7, the spout assembly 14 is completed by a closure 100 which seals the end opening 80, interfits with and covers the recess 41 and is fixed to the housing to prevent its dislodgment by differential pressure forces created by water flowing in the spout member. The closure 100 comprises a cylindrical plug element 102 which extends into the end opening 80. A seal is defined between the plug element 102 and the passageway 66 to prevent leakage of fluid from the passageway 66 past the plug element. As is best seen in FIG. 7 the seal 104 is formed by a resilient rubber or plastic O-ring which is partially disposed in a ring groove 108 extending about the plug element. When the plug is inserted in the passageway 66 the O-ring is compressed against the base and sides of the ring groove and against the wall of the passageway to form a fluid tight seal between the plug and the passageway.

Figure 8:
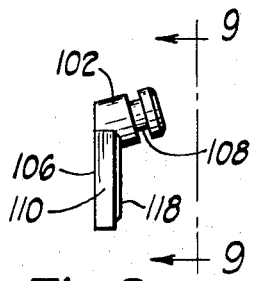
FIG. 8 is a side elevational view of a closure forming part of the assembly shown in FIG. 7.
Figure 9:
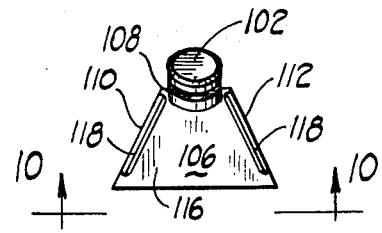
FIG. 9 is an elevational view seen from the plane indicated by the line 9—9 of FIG. 8.
Figure 10:
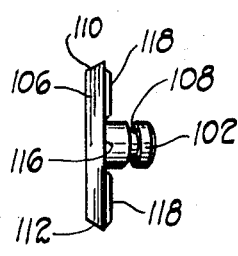
FIG. 10 is an elevational view seen from the plane indicated by the line 10—10 of FIG. 9.

A plug flange or skirt 106 extends from the plug element and is received by the recess 41. As illustrated in FIGS. 8–10, the plug 102 and the plug flange or skirt 106 are preferably formed from single piece of molded plastic and define the same silhouette as is defined by the recess 41. The flange 106 is generally triangular, merges with the rearward end of the plug 102 and extends from the plug in a plane generally transverse to the direction of extent of the plug. The flange or skirt 106 defines opposite downwardly diverging side walls 110, 112 which are beveled to dove-tail with the undercut recess side walls 92, 94.

When the plug 102 is inserted into end opening 80 the skirt 106 snaps into place in the recess 41 so that the recess side walls 92, 94 grip the skirt. As the skirt is snapped into place the material forming the side walls 92, 94 is resiliently deflected slightly to enable the skirt to enter the recess, after which the walls resiliently return toward their relaxed condition to grip the skirt 106 and maintain the closure 100 properly aligned with the spout member. Assembly of the closure 100 to the spout member 28 is easily accomplished manually.

In the preferred embodiment of the invention the closure 100 is bonded to the support body 30 to prevent the plug element 102 and seal 104 from being dislodged from the passageway 66 due to differential pressure forces acting on the plug. The inner face 116 of the skirt 106 is provided with ribs 118 which are V-shaped in cross section and extend along the sides of the surface 116, see FIG. 9. When the skirt is positioned in the recess 41, the ribs 118 engage respective ones of the lands 86–89 and the apexes of the ribs define contact lines along which the skirt 106 is ultrasonically welded to the support body. When the welding is completed the ribs are merged with the body material and the inner face 116 of the skirt 106 lies flush with the lands 86–89. The welding is accomplished by the use of conventional ultrasonic welding equipment which is therefore not illustrated.

Other means may be employed to maintain the skirt connected to the support body, such as by the application of an adhesive or solvent to bond the inner skirt face to the support body. As another alternative the snap fit between the skirt and the side walls of the recess can be relied on to maintain the skirt and plug in position during use of the spout.

Figure 11:
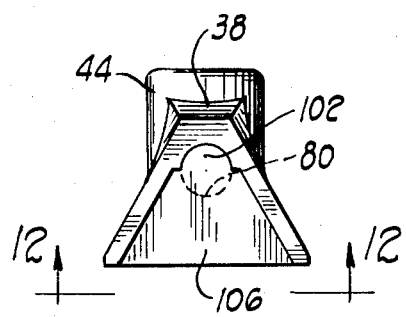
FIG. 11 is an elevational view seen from the plane indicated by the line 11—11 of FIG. 4; and, FIG. 12 is an elevational view seen from the plane indicated by the line 12—12 of FIG. 11.
Figure 12:
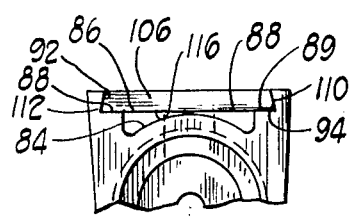

As can be seen from FIGS. 7, 11 and 12 after assembly of the closure 100 to the spout member the rearward face of the plug and plug skirt is flush with the body material surrounding the recess 41 and forms a nonfunctional rearward wall of the body which is devoid of any substantial depressions caused by plastic shrinkage.

After the spout assembly 14 has been constructed it is readily connected to a wash basin such as that shown in FIG. 1. As is illustrated in FIG. 7 the mixing valve outlet is defined by an upwardly extending threaded nipple 120 which projects through a hole 122 in the sink top. The drain plug actuator 18 comprises a tubular sleeve 124 surrounding an actuator rod 126, both of which project upwardly through the nipple 120. The upper end of the sleeve 124 is shouldered to provide a seat for an O-ring 128 which is disposed about the shoulder on the sleeve 124. A sealing washer 130 is seated about the upwardly facing annular end of the nipple 120.

The connector portion 52 of the support body 30 is threaded to the nipple 120 and the spout assembly 14 is turned onto the nipple 120 with the actuating rod 126 aligned with and extending through the top opening 45 in the support body. The spout assembly 14 is threaded onto the nipple until the spout is oriented as desired with respect to the wash basin with the washer 130 sealingly compressed between the shoulder 54 and the nipple 120 and the O-ring 128 sealingly engaged between the sleeve 124 and the support body. A suitable operating knob 132 can then be fixed to the projecting end of the actuating rod 126. It should be noted that the sleeve 124 is of substantially smaller diameter than the internal diameter of the nipple 120 and the inlet passage 56 so that substantially unrestricted flow of water from the mixing valve through the spout is assured.

While only one embodiment of the present invention has been illustrated and described the invention is not to be considered limited to the precise construction shown. The intention is to cover all adaptations, modifications and uses of the invention which come within the scope of the appended claims.

What is claimed is:

1. A molded plastic fixture comprising:
    a. a support body portion defining an inlet flow passage extending into the fixture and structure for connecting said support portion to a supply conduit;
    b. a spout portion projecting from said support portion which defines a discharge opening at a projecting end of the spout portion and a flow passageway extending within said spout portion and communicating said discharge opening with said inlet flow passage;
    c. said flow passageway extending through and beyond said inlet passage and defining an end opening in the body on the side thereof opposite the spout portion and remote from said discharge opening; and,
    d. a closure for said end opening comprising a plug element extending into said passageway through said end opening and fluid seal means sealingly disposed between said plug element and a surrounding wall portion of said second passageway;
    e. said plug element defining a surface disposed transversely to the direction of extent of said passageway, said surface engaging said body for attaching said plug element and seal means to said body.

2. A fixture as claimed in claim 1 wherein said surface defined by said plug element is connected to said body by at least one weldment.

3. A fixture as claimed in claim 1 wherein said surface is formed on a flange extending from said plug element, said body defining a recess adjacent at least a portion of said end opening and said flange interfitting with said recess so that the exteriorly facing surfaces of said flange and plug element define an exterior face of the fixture.

4. A fixture as claimed in claim 3 wherein at least a side wall portion of said recess is undercut and a corresponding edge portion of said flange is bevelled so that said flange snaps into place in said recess and is retained in position by engagement of said sidewall portion and edge portion.

5. A fixture as claimed in claim 1 wherein said plug element surface portion supports at least a rib engageable with said body portion when said plug element is inserted in said passageway, said body portion and said closure being ultrasonically welded together with said rib providing an ultrasonic weld connection therebetween.

6. A fixture as claimed in claim 1 wherein said structure for connecting said support body to said conduit comprises a cylindrical threaded opening, said body defining a recess in the side thereof opposite to said spout portion, said recess defined by side wall portions molded to said body portion which at least partially surround said recess, said recess having a base defined at least in part by a cylindrical wall portion extending about part of said threaded opening and with said passageway end opening defined in said recess, said plug element surface defined by a plug flange portion shaped to conform to the recess side walls.

7. A molded plastic fixture comprising:
   a. a molded body defining an inlet passage extending into said fixture;
   b. a tubular spout molded to said body and projecting forwardly therefrom, said spout defining a discharge opening adjacent a forwardly projecting end thereof, and a flow passageway communicating with said discharge opening and extending rearwardly through said spout and body and intersecting said inlet passage, said flow passageway having an end remote from said discharge opening defining a rearward end opening in said body; and
   c. closure means for said flow passageway end opening comprising a plug element extending into said flow passageway through said rearward end opening, a seal element disposed between said plug element and a surrounding flow passageway portion for preventing leakage of fluid from said passageway end opening around said plug element, and structure attached to said plug element and extending from said plug element for engaging said body, said structure fixed against movement relative to the body in the direction of extent of said plug element to prevent the plug element and seal from being dislodged from said passageway.

8. A fixture as claimed in claim 7 wherein said structure attached to said plug comprises a plug skirt molded to said plug element and extending along said body from said end opening.

9. A fixture as claimed in claim 8 wherein said body defines a molded recess at its rearward side, said plug skirt at least covering said recess.

10. A molded plastic spout assembly comprising:
   a. a molded support body connectable to a fluid supply conduit and defining an inlet flow passage;
   b. a tubular spout member molded to said support body and projecting therefrom, said spout member defining a discharge opening adjacent its projecting end remote from said support body and a flow passageway extending from the discharge opening through the spout member and support body and defining an end opening in the support body remote from the discharge opening;
   c. said flow passageway intersecting said inlet passage to enable fluid flow from said inlet passage through said flow passageway and said discharge opening; and,
   d. closure means for said flow passageway end opening comprising a plug element extending into said flow passageway end opening, seal means between said plug element and said flow passageway and a skirt-like projection defined by said plug element;
   e. said body defining a recess adjacent said end opening with said skirt disposed in said recess and connected to said body to prevent movement of said plug element from said flow passageway in response to differential pressure forces acting on said plug element.

11. The assembly claimed in claim 10 wherein said skirt is bonded to said body.

12. The assembly claimed in claim 10 wherein said body further defines a top opening substantially aligned with said inlet flow passage, and a movable member extending through said top opening.

* * * * *